(12) United States Patent
Tanaka

(10) Patent No.: US 9,518,649 B2
(45) Date of Patent: Dec. 13, 2016

(54) SHIFT ROD DEVICE OF MOTORCYCLE

(71) Applicant: SUZUKI MOTOR CORPORATION, Hamamatsu-shi, Shizuoka (JP)

(72) Inventor: Koichi Tanaka, Hamamatsu (JP)

(73) Assignee: SUZUKI MOTOR CORPORATION, Hamatsu-Shi, Shizuoka (JP)

(*) Notice: Subject to any disclaimer, the term of this patent is extended or adjusted under 35 U.S.C. 154(b) by 144 days.

(21) Appl. No.: 14/552,743

(22) Filed: Nov. 25, 2014

(65) Prior Publication Data
US 2015/0152964 A1 Jun. 4, 2015

(30) Foreign Application Priority Data

Nov. 29, 2013 (JP) ................................. 2013-247928

(51) Int. Cl.
| | | |
|---|---|---|
| *F16H 61/00* | (2006.01) | |
| *F16H 59/02* | (2006.01) | |
| *F16H 61/26* | (2006.01) | |
| *F16H 63/18* | (2006.01) | |

(52) U.S. Cl.
CPC .............. *F16H 59/02* (2013.01); *F16H 61/26* (2013.01); *F16H 63/18* (2013.01); *F16H 2059/0234* (2013.01); *F16H 2059/0239* (2013.01); *Y10T 74/20055* (2015.01)

(58) Field of Classification Search
CPC .......... F16H 59/02; F16H 61/26; F16H 63/18; F16H 2059/0234; F16H 2059/0239
See application file for complete search history.

(56) References Cited

U.S. PATENT DOCUMENTS

| | | | | |
|---|---|---|---|---|
| 5,079,969 | A * | 1/1992 | Kato ..................... | B60W 30/18 477/109 |
| 5,174,172 | A | 12/1992 | Kanemura et al. | |
| 5,599,253 | A * | 2/1997 | Ishibashi ................ | F02B 25/14 123/65 PE |
| 8,403,093 | B2 * | 3/2013 | Kosugi .................. | B62M 25/06 180/230 |
| 2002/0088429 | A1 * | 7/2002 | Morikami ............... | F01P 11/16 123/333 |
| 2011/0184614 | A1 * | 7/2011 | Keilers ................. | B60W 10/08 701/54 |
| 2015/0152964 | A1 * | 6/2015 | Tanaka .................. | F16H 59/02 74/473.16 |

FOREIGN PATENT DOCUMENTS

| | | | | |
|---|---|---|---|---|
| DE | 102011086243 A1 * | 5/2013 | ............... | G01B 7/30 |
| JP | 03-290031 | 12/1991 | | |
| JP | 2544067 | 8/1997 | | |

* cited by examiner

*Primary Examiner* — David M Fenstermacher
(74) *Attorney, Agent, or Firm* — Troutman Sanders LLP

(57) ABSTRACT

There is provided a link mechanism configured such that a shift rod driven by an operation of a gear shift pedal drives a shift shaft to rotate via a gear shift lever. A stroke sensor measuring a stroke amount, and a shift load sensor making a stroke motion in extension and contraction directions in accordance with shift-up and shift-down operating loads from the gear shift pedal are integrally provided to the shift rod.

7 Claims, 7 Drawing Sheets

SHIFT ROD DEVICE OF MOTORCYCLE

CROSS-REFERENCE TO RELATED APPLICATIONS

This application is based upon and claims the benefit of priority of the prior Japanese Patent Application No. 2013-247928, filed on Nov. 29, 2013, the entire contents of which are incorporated herein by reference.

BACKGROUND OF THE INVENTION

1. Field of the Invention

The present invention relates to a shift rod device for driving a transmission apparatus when a gear shift is performed by a shift pedal operation of a rider in a motorcycle.

2. Description of the Related Art

For reducing a lap time in a motorcycle being a large-sized motorcycle which is so-called super sport, and such as one to be a base vehicle for competition, how to improve an acceleration performance exerts a large influence. As one method of improving the acceleration performance, there is a method in which a period of time of omission of driving force which is inevitably generated at a time of gear shift is reduced to be an extremely short period of time.

Conventionally, a method of detecting a rotation of shift rod by a switch, and a method of disposing load sensors of load cell type on a shift rod and understanding an intention of a rider that he/she tries to perform a gear shift by detecting signals or load values of the sensors, have been known. A method in which, based on such signals, an engine output is reduced for a moment by an ignition misfire, an ignition delay or the like of an ignition plug through a control of an ECU (Engine Control Unit), thereby making a gear shift to be performed in the moment in which an engagement force of gear dog is reduced, has been adopted.

For example, in the disclosed Patent Document 1, it is designed such that in a gear shift mechanism of a motorcycle, a shift load sensor which detects an operating load at a time of shifting is attached to a link member to detect an operating state of a shift pedal. Further, Patent Document 2 discloses this type of mechanism or device.

[Patent Document 1] Utility Model Registration Publication No. 2544067

[Patent Document 2] Japanese Laid-open Patent Publication No. 03-290031

The conventional devices use the load sensors of load cell type, and the sensors of load cell type are generally expensive and have problems such that noises due to engine vibration are output from the sensors, or the durability with respect to the vibration is not always sufficient.

Further, the sensor of load cell type does not extend or contract due to its structure, so that in a process of applying a load, a rotational force is generated on a gear shift lever. Further, when a force at which mutual gear dogs are engaged is weak at a rotation speed at which a generation of driving force is small, an erroneous operation of unintended gear shift easily occurs. Further, since a sensor main body does not extend or contract, there is a problem such that, when an operating load of a rider is small or when a period of time in which the operating load is applied is short, for example, the operating load is reduced during a rotation of the gear shift lever, and if no measure is taken, the gear shift is not properly completed.

Meanwhile, regarding the load sensor of switch type, two of the sensors have to be provided for disposing the sensors for both of a shift-up and a shift-down, and thus a size thereof is inevitably increased. Further, switch signals are used for determination, so that there is a problem such that when, for example, a load applied to a gear shift lever and a shift rod is varied during a gear shift, the switch signal is generated at an unintended time.

Further, the device related to Patent Document 1 is one that detects a shift-up state, so that in order to detect a shift-down, there is a need to additionally provide a sensor for load in a direction opposite to that of the shift-up to the link member. In that case, there is a problem such that a size of the device and the number of parts are inevitably increased, which leads to an increase in cost.

SUMMARY OF THE INVENTION

In view of such circumstances, the present invention has an object to provide a shift rod device of a motorcycle effectively realizing a miniaturization, a compactness and the like of the device while guaranteeing a proper operation of the device.

It is characterized in that a shift rod device of a motorcycle of the present invention being a shift rod device of a motorcycle having a link mechanism, in a motorcycle having a transmission making a shifting dog to be moved via a shift cam and a shift fork by a rotation of a shift shaft, in which a shift rod driven by an operation of a gear shift pedal is configured to drive the shift shaft to rotate via a gear shift lever, includes a stroke sensor measuring a stroke amount, and a shift load sensor making a stroke motion in extension and contraction directions in accordance with shift-up and shift-down operating loads from the gear shift pedal, the stroke sensor and the shift load sensor being integrally provided to the shift rod.

Further, it is characterized in that in the shift rod device of the motorcycle according to the present invention, the shift rod is formed of a shift rod adjuster and a shift rod body, in which a piston, a first plunger, a second plunger, a first spring, a second spring, a stopper pin, and a magnet are built in the shift rod body as components of the shift load sensor, and these components make a stroke motion along the same axis in an inside of the shift rod body, and the stroke sensor is disposed on an outer surface of the shift rod body by facing the magnet, and relatively detects a movement amount of the magnet in a non-contact manner.

Further, it is characterized in that in the shift rod device of the motorcycle according to the present invention, the stroke sensor is fastened and fixed to the shift rod body by screws.

Further, it is characterized in that in the shift rod device of the motorcycle according to the present invention, the first spring and the second spring that apply extension or contraction reaction forces of the shift load sensor are disposed at positions, on both sides of the piston, at which they face each other by sandwiching the first plunger and the second plunger, respectively, therebetween.

Further, it is characterized in that in the shift rod device of the motorcycle according to the present invention, the piston is sandwiched by the first plunger and the second plunger, the first spring presses the first plunger, the second spring presses the second plunger, and because of spring reaction forces of the respective first spring and second spring, the piston returns to a neutral position when the operating load is not applied.

Further, it is characterized in that in the shift rod device of the motorcycle according to the present invention, a dimension of a length of the piston and a dimension of a width between stepped portions provided on an inner surface of the shift rod body are the same.

Further, it is characterized in that in the shift rod device of the motorcycle according to the present invention, the magnet is provided on an axis same as that of the stopper pin that regulates an extension or contraction movement amount of the shift load sensor, and the stopper pin is formed of a metal member having no magnetism or having a magnetism at a level of substantially exerting no influence on a detection accuracy of the stroke sensor.

Further, it is characterized in that in the shift rod device of the motorcycle according to the present invention, the extension or contraction movement amount of the shift load sensor is regulated by an outside diameter of the stopper pin and an inside diameter of a stopper hole provided to the shift rod body.

DETAILED DESCRIPTION OF THE PREFERRED EMBODIMENTS

Hereinafter, a preferred embodiment of a shift rod device of a motorcycle in the present invention will be described based on the drawings.

Figure 1:
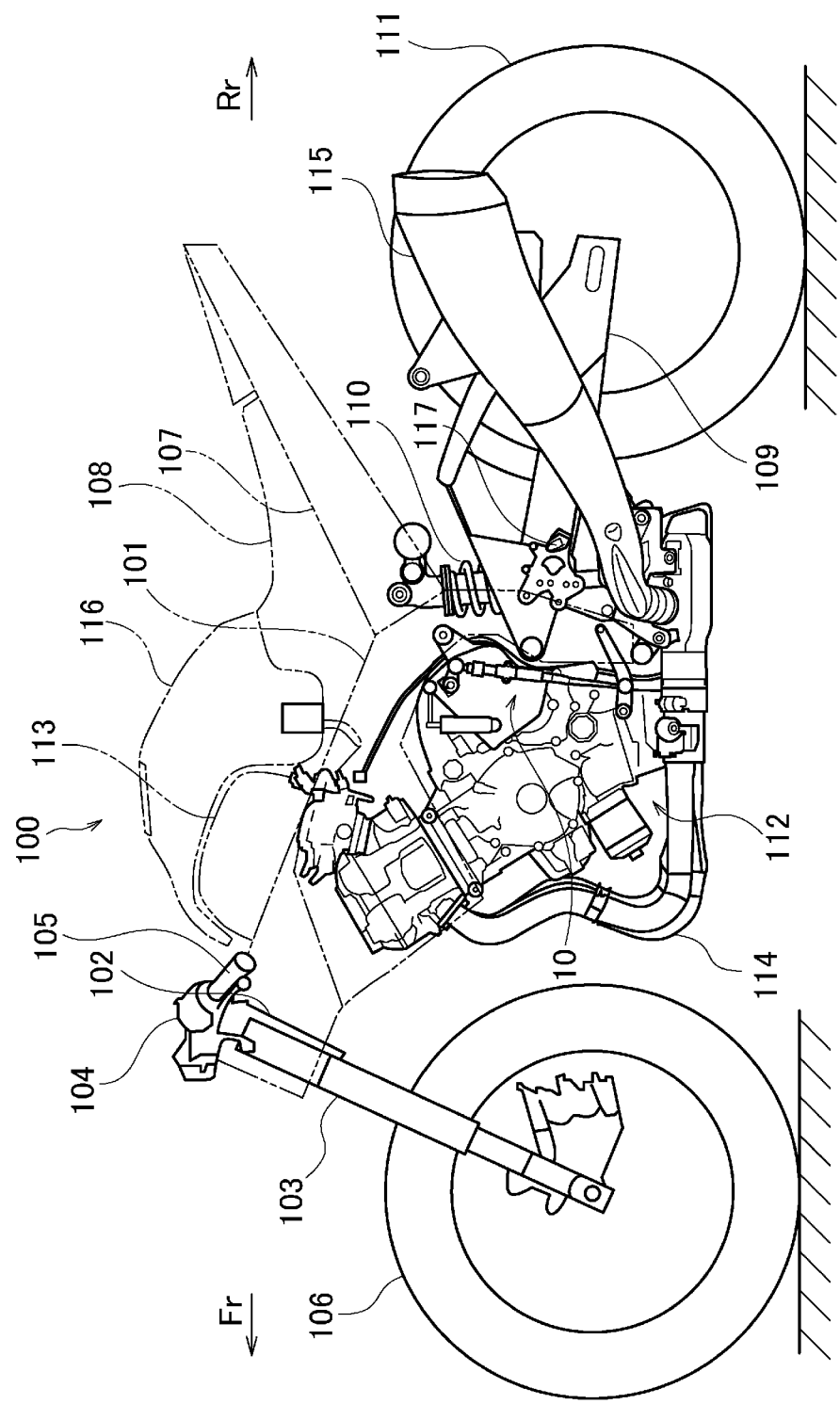
FIG. 1 is a side view of a motorcycle related to an embodiment of the present invention.

FIG. 1 is a side view of a motorcycle 100 as an application example of the present invention. First, the entire configuration of the motorcycle 100 will be described by using FIG. 1. Note that in the drawings used in the following description including FIG. 1, a front side, a rear side, a lateral right side, and a lateral left side of a vehicle are indicated by an arrow mark Fr, an arrow mark Rr, an arrow mark R, and an arrow mark L, respectively, according to need.

In FIG. 1, a main configuration of the motorcycle 100 will be described or illustrated hereinafter. On front portions of vehicle body frames 101 (main frames) made of steel or aluminum alloy material, there are provided two right and left front forks 103 supported to be able to pivot in a right-and-left direction by a steering head pipe 102. On upper ends of the front forks 103, a handle bar 104 is fixed, and both ends of the handle bar 104 have grips 105. On lower portions of the front forks 103, a front wheel 106 is rotatably supported, and a front fender (not illustrated) is fixed so as to cover a part above the front wheel 106. The front wheel 106 has a brake disk which integrally rotates therewith.

The vehicle body frames 101 are integrally coupled to a rear portion of the steering head pipe 102, the pair of right and left frames are branched into a two-pronged shape toward the rear direction, and extend rearward and downward from the steering head pipe 102 while enlarging a width thereof. In the present example, the vehicle body frames 101 may be a so-called twin spar frame. A seat rail 107 extends rearward by being moderately inclined rearward and upward from the vicinity of rear portions of the vehicle body frames 101, and supports a seat 108. Further, a swing arm 109 is coupled to the rear portions of the vehicle body frames 101 in a swingable manner in an up-and-down direction, and a rear shock absorber 110 is laid between the vehicle body frames 101 and the swing arm 109. A rear wheel 111 is rotatably supported on a rear end of the swing arm 109. The rear wheel 111 is driven to rotate via a driven sprocket around which a chain for transmitting motive power of an engine is wound. In an immediate periphery of the rear wheel 111, an inner fender (not illustrated) covering the vicinity of a front upper portion of the rear wheel 111 is provided, and a rear fender may be provided at a position above the inner fender.

To an engine unit 112 mounted on the vehicle body frames 101, an air-fuel mixture made of an air and a fuel which are supplied from an air cleaner 113 and a fuel supply device, respectively, is supplied, and exhaust gas after combustion in the engine passes through an exhaust pipe 114 to be exhausted from a muffler 115. At a position above the engine unit 112, a fuel tank 116 is mounted, and the seat 108 is continuously provided behind the fuel tank 116.

In the vehicle exterior, mainly a front portion and side portions of the vehicle are covered by cowlings or side cowls, a rear portion of the vehicle is covered by a side cover or a seat cowl, and by these exterior members, an outer form of the vehicle having a so-called streamlined shape is formed. A rider who rides such a motorcycle 100 can operate the motorcycle 100 by putting his/her feet on steps 117 and gripping the grips 105.

Figure 2:
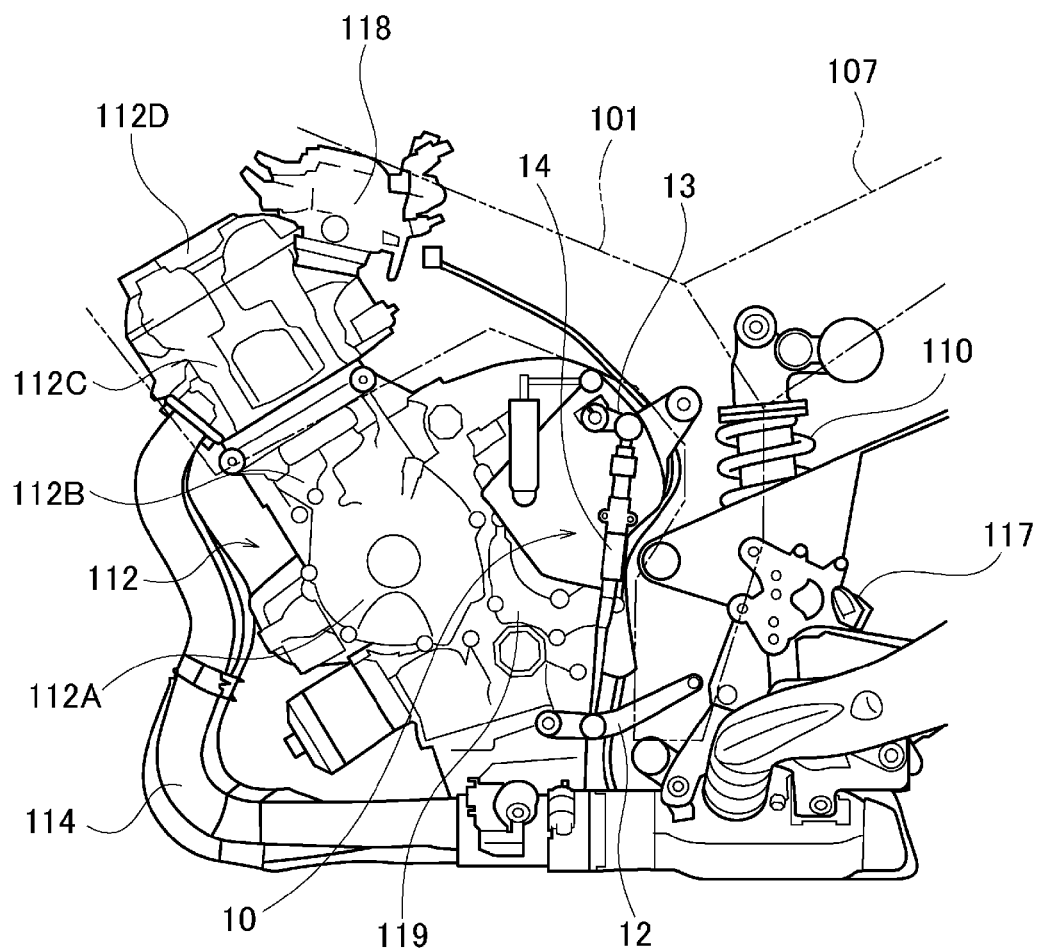
FIG. 2 is a side view illustrating a periphery of an engine unit in the embodiment of the present invention.

Although an illustration is omitted, in the present embodiment, the engine of the engine unit 112 may be a four-cycle multicylinder engine, typically, a parallel four-cylinder engine, for example. As illustrated in FIG. 2, the engine unit 112 in this embodiment is formed in a manner that a cylinder 112B, a cylinder head 112C, and a cylinder head cover 112D are sequentially and integrally coupled at a portion above a crankcase 112A. Further, the engine unit 112 is suspended on the vehicle body frames 101 via a plurality of engine mounts to be integrally coupled to and supported by the vehicle body frames 101, and the engine unit 112 itself works as a rigid member of the vehicle body frames 101.

The air cleaner 113 and the engine unit 112, especially the cylinder head 112C are connected by throttle bodies 118 forming an intake device as illustrated in FIG. 2. The air cleaned by the air cleaner 113 is sucked by the intake device and is supplied with the fuel from the fuel supply device, so that the air-fuel mixture with a predetermined mixture ratio is fed to an intake port of the cylinder head 112C. As can be understood from FIG. 2 as well, the air cleaner 113 is positioned above the cylinder head 112C, and is supported afloat by the vehicle body frames 101 and so on via an elastic member such as a cushion rubber. In an intake passage connecting the intake port of the cylinder head 112C communicating with an engine combustion chamber and the air cleaner 113, the throttle bodies 118 are disposed in vertical posture to extend in a substantially vertical direction, as illustrated in FIG. 2, that is, the present example has a downdraft intake structure.

At a rear portion of the crankcase 112A, a transmission case 119 is integrally formed, as illustrated in FIG. 2, and a later-described transmission apparatus (transmission) is disposed and configured in the transmission case 119. In the transmission apparatus, a shifting dog is designed to be moved by a rotation of a shift shaft via a shift cam and a shift fork in the transmission case 119, and there is provided a shift rod device 10 which drives the shift shaft to rotate with the use of a shift pedal operation of a rider.

Figure 3:
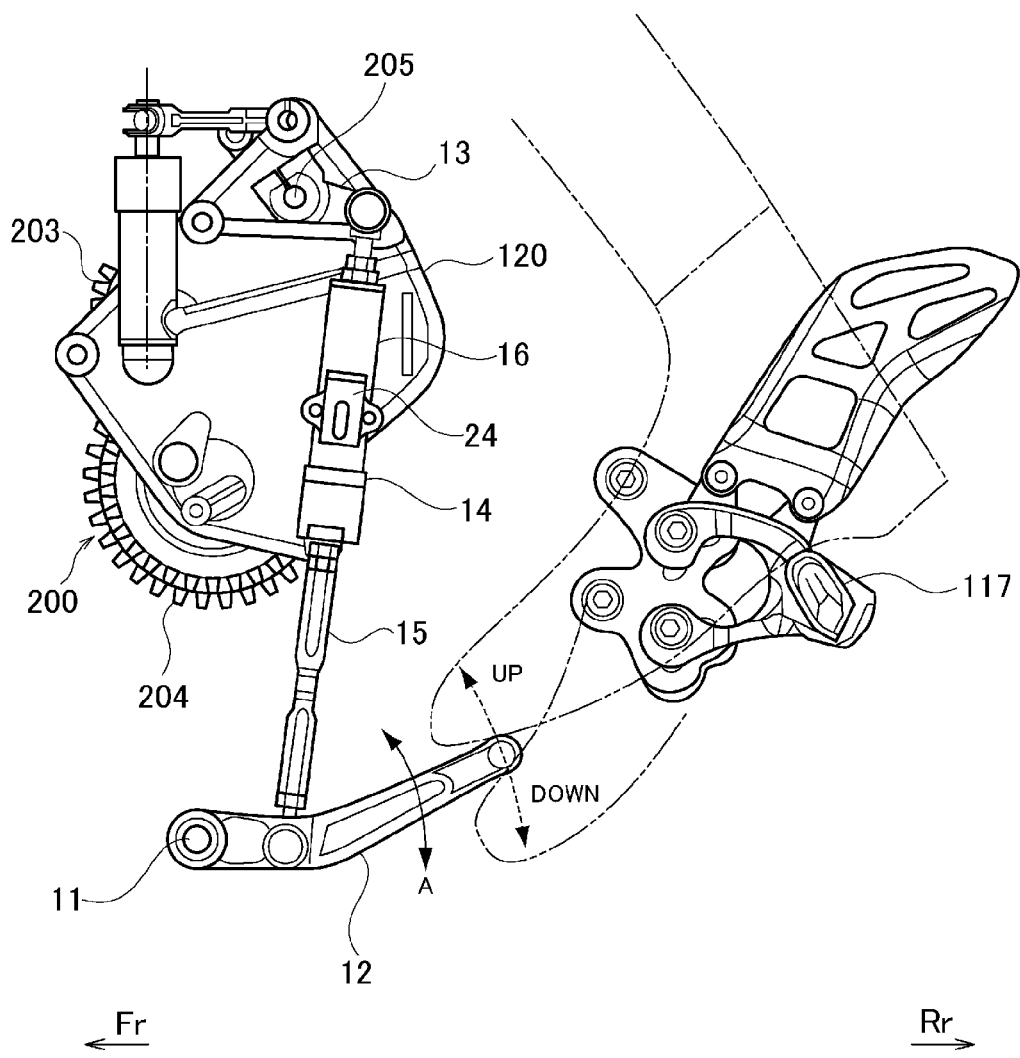
FIG. 3 is a diagram illustrating a schematic configuration example of a periphery of a shift rod device in the embodiment of the present invention.

FIG. 3 illustrates a schematic configuration example of a periphery of the shift rod device 10. Although details thereof will be described later, the shift rod device 10 is configured by including a gear shift pedal 12 pivotally supported in a swingable manner in the up-and-down direction (arrow mark A in FIG. 3) around a supporting shaft 11 on the outside at a lower left portion of the engine unit 112 (vicinity of the outside left at a lower portion of the crankcase 112A), a gear shift lever 13 pivotally fitted to a shaft end portion (a left-side shaft end portion, in this example) of a shift shaft 205 of the transmission apparatus 200 to rotate the shift shaft 205, and a shift rod 14 coupling between the gear shift pedal 12 and the gear shift lever 13. There is provided a link mechanism configured such that the shift rod 14 driven by an operation of the gear shift pedal 12 drives the shift shaft 205 to rotate via the gear shift lever 13. Note that to an output shaft end of the transmission apparatus 200, a drive sprocket around which a chain for driving the rear wheel 111 is wound is fitted (illustration of any of the elements is omitted), a sprocket cover 120 covering the drive sprocket is attached to the outside left of the transmission case 119, and the gear shift lever 13 and the shift rod 14 are disposed on the left side and in the vicinity of the sprocket cover 120.

Figure 4:
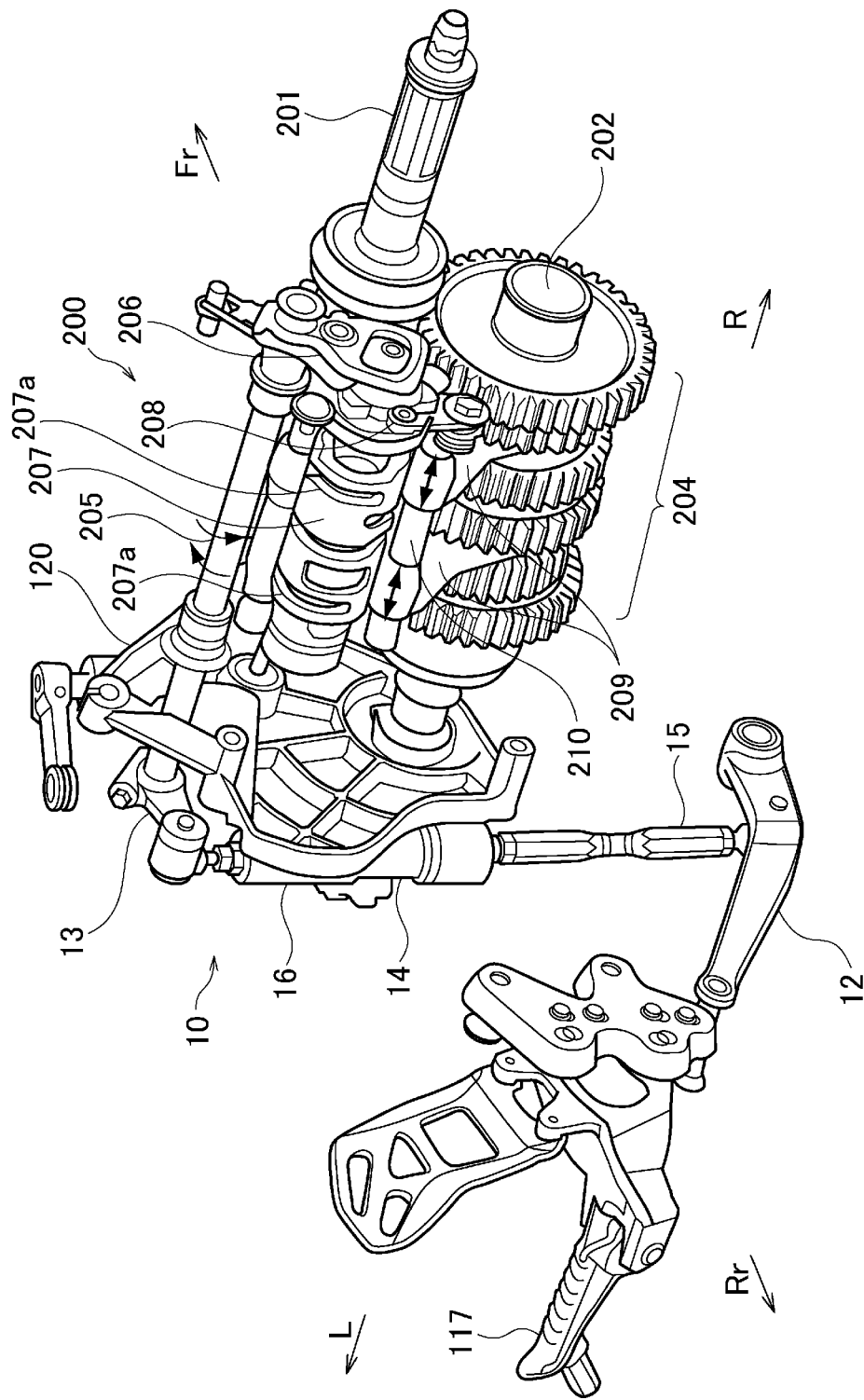
FIG. 4 is a perspective view of a transmission apparatus in the embodiment of the present invention when seen from a rear direction.

Here, the transmission apparatus configured in the transmission case 119 will be described. FIG. 4 illustrates a perspective view of the transmission apparatus 200 when seen from the rear direction. In the transmission case 119, a counter shaft 201 and a drive shaft 202 are disposed in parallel with each other with a predetermined interval provided therebetween, as illustrated in FIG. 4, in parallel with a crankshaft at a position behind the crankshaft. A gear train 203 (drive side, refer to FIG. 3) and a gear train 204 (driven side) each formed by including a plurality of transmission gears are arranged on the counter shaft 201 and the drive shaft 202, respectively, along an axial direction of the shafts. It is designed such that by a gear shift mechanism, predetermined gears between the gear train 203 and the gear train 204 engage with each other, and a rotation of the counter shaft 201 is shifted and transmitted to the drive shaft 202 via those gears. To a left shaft end portion of the drive shaft 202, the above-described drive sprocket is attached, and there is formed a power transmission path from the engine unit 112 to the rear wheel 111 via a chain wound between a sprocket (not illustrated) mounted on an axle of the rear wheel 111 (FIG. 1) and the drive sprocket.

In the above-described case, the predetermined gears in the gear train 203 and the gear train 204 are coupled to be integrally rotatable with the counter shaft 201 or the drive shaft 202, and further, a part of the gears are rotatably coupled or coupled in a slidable manner along the axial direction of the counter shaft 201 or the drive shaft 202. In this case, by sliding the predetermined gears, the mutual gears adjacent to each other are configured to be coupled in an integrally rotatable manner via a dog clutch, namely, it is designed such that a part between the counter shaft 201 and the drive shaft 202 can be connected by a combination of desired one set of transmission gears, with the use of an operation of the gear shift mechanism.

Further, the transmission apparatus 200 has a gear shift mechanism, and the gear shift mechanism is configured by including a shift shaft 205, a shift arm 206, a shift cam 207, a shift cam stopper 208, a shift fork 209 and the like. In this case, the shift shaft 205 is arranged in parallel with the counter shaft 201, and is pivotally supported in a rotatable manner at a position above the shift cam 207. The shift shaft 205 rotates in conjunction with the shift operation of the gear sift pedal 12 described above. For example, in a shift operation for shift-up, the shift shaft 205 rotates in one direction, and in a shift operation for shift-down, the shift shaft 205 rotates in the other direction being a direction opposite to the one direction. To a right end portion of the shift shaft 205, the shift arm 206 which swings in accordance with the rotation of the shift shaft 205 is pivotally fitted, as illustrated in FIG. 4. The shift arm 206 is formed in a shape of spatula plate extending downward, and is disposed so as to cover the shift cam 207 from the right side. The shift arm 206 swings in either front direction or rear direction in accordance with the rotation of the shift shaft 205, and is biased to be returned to a neutral state after the swing.

The shift cam 207 is similarly arranged in parallel with the counter shaft 201, and is pivotally supported in a rotatable manner at a position above the drive shaft 202. On an outer peripheral surface of a cylindrical cam main body in the shift cam 207, a predetermined number of cam grooves 207a having a predetermined shape are formed. Although detailed illustration and the like are omitted, to a right end portion of the cam main body of the shift cam 207, an arm engagement portion which engages with the shift arm 206 is fixed, and when the arm engagement portion pivots, the shift cam 207 rotates. The shift cam stopper 208 is disposed in the vicinity of the arm engagement portion of the shift cam 207, and is biased in a direction in which it engages with a positioning portion of the shift cam 207, to thereby perform positioning of a rotational position of the shift cam 207.

The shift fork 209 is supported in a manner that it can reciprocate along a shift fork shaft 210, as indicated by bidirectional arrows in FIG. 4. The shift fork shaft 210 is pivotally supported so as to be parallel with each of the counter shaft 201 and the drive shaft 202. The shift fork 209 engages with the predetermined cam grooves 207a of the shift cam 207, and engages between adjacent predetermined two transmission gears out of the gear train 203 and the gear train 204 of the counter shaft 201 and the drive shaft 202. When the shift cam 207 rotates, the shift fork 209 moves in an axial direction of the shift fork shaft 210 in accordance with the shape of the cam grooves 207a. The shift fork 209 moves the predetermined transmission gears in the axial direction of the counter shaft 201 or the drive shaft 202 in accordance with the movement thereof. Consequently, the predetermined transmission gears move between the gear train 203 and the gear train 204, resulting in that the transmission path of rotary motive power from the counter shaft 201 to the drive shaft 202, namely, the combination of the transmission gears is changed.

In the shift rod device 10 of the present invention, to the shift rod 14 coupling the gear shift pedal 12 and the gear shift lever 13, a stroke sensor which measures a stroke amount, and a shift load sensor which makes a stroke motion in extension and contraction directions by corresponding to shift-up and shift-down operating loads from the gear shift pedal 12, namely, for detecting a shift direction being either shift-up or shift-down direction and a load at the time of the shifting, are integrally provided.

Figure 5A:
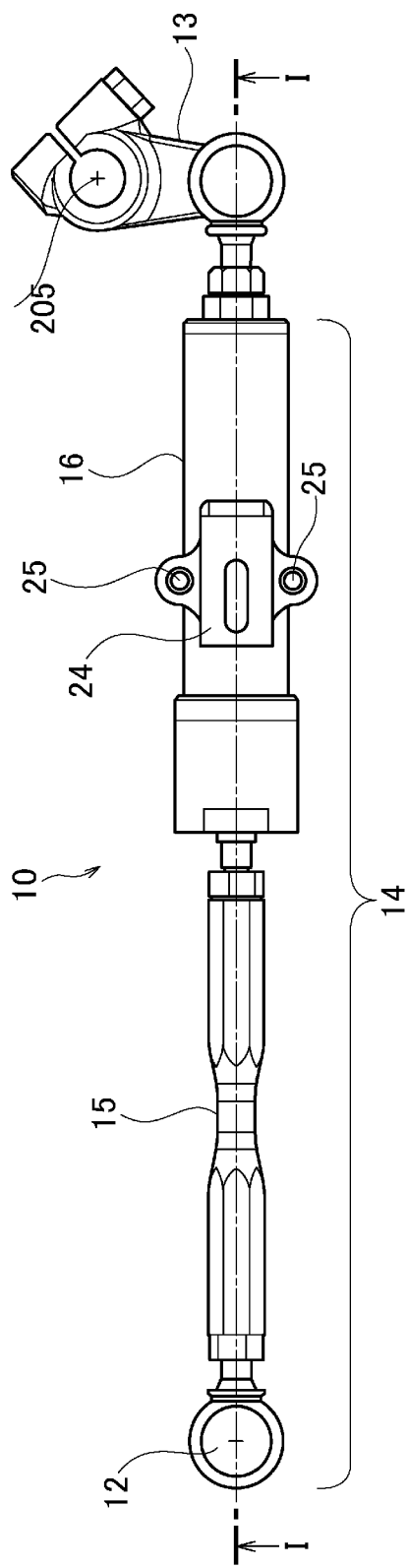
FIG. 5A is a front view illustrating the shift rod device related to the embodiment of the present invention.

Here, as illustrated in FIG. 5A, the shift rod 14 is configured by a shift rod adjuster 15 and a shift rod body 16. The shift rod adjuster 15 and the shift rod body 16 are mutually coupled, in which the shift rod adjuster 15 is connected on the gear shift pedal 12 side, and the shift rod body 16 is connected on the gear shift lever 13 side.

Figure 5B:
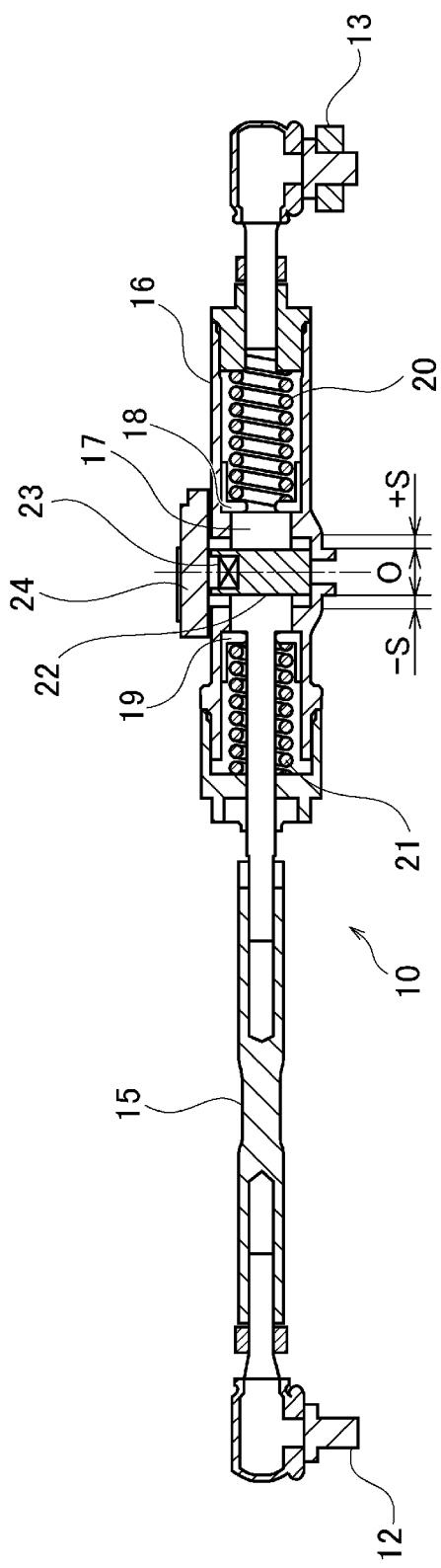
FIG. 5B is a sectional view taken along line I-I in FIG. 5A illustrating the shift rod device related to the embodiment of the present invention.

As illustrated in FIG. 5B, the shift rod body 16 has a substantially hollow structure (cylindrical form), and a piston 17, a first plunger 18, a second plunger 19, a first spring 20 (coil spring), a second spring 21, a stopper pin 22, and a magnet 23 are built in the shift rod body 16 as components of the shift load sensor, in which these components are arranged so as to make a stroke motion along the same axial direction in the shift rod body 16.

Further, a stroke sensor 24 is disposed on an outer surface of the shift rod body 16 by facing the magnet 23, and is designed to relatively detect a movement amount of the magnet 23 in a non-contact manner. Note that the stroke sensor 24 is fastened and fixed to the shift rod body 16 by using screws 25 (FIG. 5A).

The piston 17 is attached in a manner that it can make a predetermined stroke reciprocating motion in the shift rod body 16 along the axial direction of the shift rod body 16, and when no operating load from the gear shift pedal 12 side is applied, the piston 17 is positioned at a center of the stroke (neutral position O in FIG. 5B). Meanwhile, an operating load on the extension side or the contraction side is applied to the piston 17, the piston 17 can move from the neutral position O to one side and to the other side being a side opposite to the one side by stroke ±S.

In the above-described case, the first spring 20 and the second spring 21 (coil springs are suitably employed) that apply extension or contraction reaction forces of the shift load sensor are disposed at positions, on both sides in the stroke direction of the piston 17, at which they face each other by sandwiching the first plunger 18 and the second plunger 19, respectively, therebetween.

Further, the piston 17 is sandwiched by the first plunger 18 and the second plunger 19, the first spring 20 presses the first plunger 18, and the second spring 21 presses the second plunger 19. Further, because of the spring reaction forces of the respective first spring 20 and second spring 21, the piston 17 is designed to return to the neutral position O when no operating load is applied.

Figure 6A:
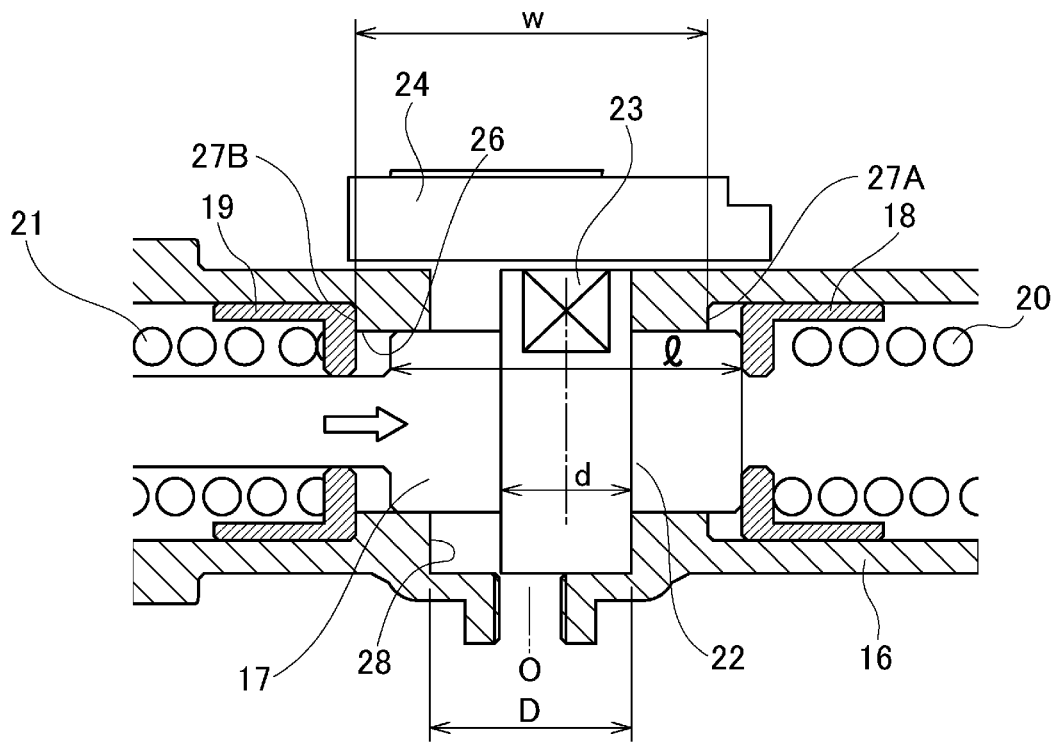
FIG. 6A is a sectional view of a substantial part explaining an operation of the shift rod device related to the embodiment of the present invention.
Figure 6B:
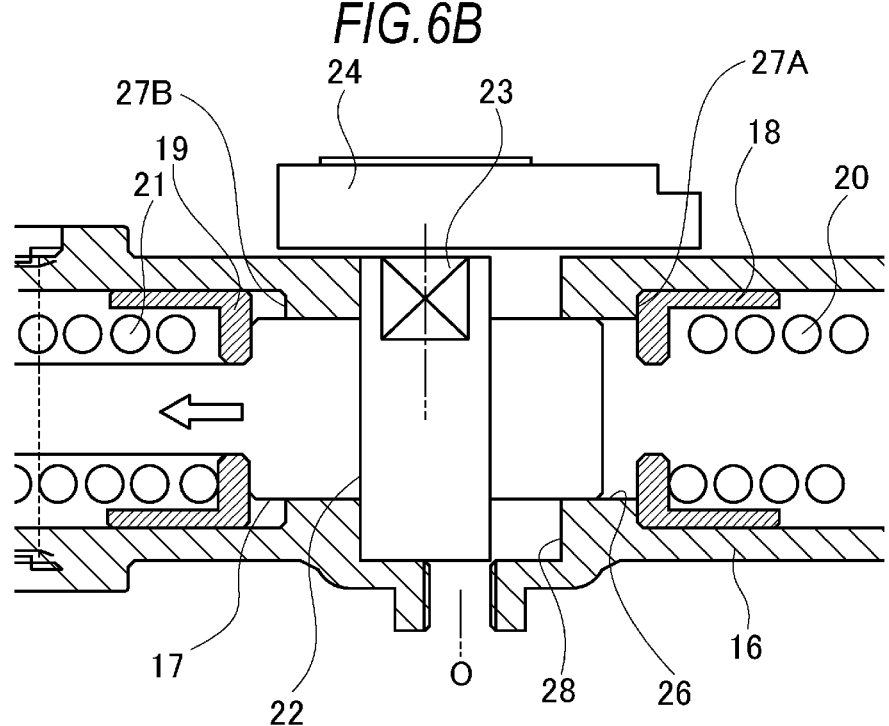
FIG. 6B is a sectional view of the substantial part explaining an operation of the shift rod device related to the embodiment of the present invention.

Here, FIG. 6A illustrates a disposition relationship of the respective members at a stroke end of a contraction-side operation, and FIG. 6B illustrates a disposition relationship of the respective members at a stroke end of an extension-side operation, in which the piston 17 is displaced by the stroke S in the contraction direction and in the extension direction, respectively, with respect to the neutral position O. On an inner peripheral surface of the shift rod body 16, there is formed a guide hole 26, along the axial direction of the shift rod body 16, for the piston 17 which performs the reciprocation as above, and at both ends of the guide hole 26, stepped portions 27A and 27B are provided. A position of the first plunger 18 is regulated when the first plunger 18 abuts against the stepped portion 27A, and a position of the second plunger 19 is regulated when the second plunger 19 abuts against the stepped portion 27B. As illustrated in FIG. 6A, a dimension of a width w between the mutual stepped portion 27A and stepped portion 27B (a width between the stepped portions) is set to a dimension same as that of a length l of the piston 17. For this reason, when the piston 17 is at the neutral position O, the first plunger 18 and the second plunger 19 abut against the stepped portion 27A and the stepped portion 27B, respectively.

The stopper pin 22 that regulates the extension or contraction movement amount of the shift load sensor projects in a direction orthogonal to the stroke direction of the piston 17. The magnet 23 is provided on an axis same as that of the stopper pin 22, and the stopper pin 22 is suitably formed of a metal material having no magnetism. Note that the stopper pin 22 is allowed to have a magnetism at a level of substantially exerting no influence on a detection accuracy of the stroke sensor 24.

Further, on the shift rod body 16, a stopper hole 28 with which the stopper pin 22 engages, is formed along the axial direction of the shift rod body 16. The stopper hole 28 may be a long hole in which the stroke direction of the piston 17 is set to a major axis, and as illustrated in FIG. 6A, the extension or contraction movement amount of the shift load sensor is regulated by an outside diameter d of the stopper pin 22 and an inside diameter D of the stopper hole 28 of the shift rod body 16.

In the above-described case, the stroke sensor 24 in the present example detects a position of the magnet 23 by a magneto-sensitive element, namely, it detects a stroke position of the piston 17. A relationship between the stroke position of the piston 17 and an output voltage V obtained by the stroke sensor 24 changes as illustrated in a stroke/voltage characteristic diagram in FIG. 7, for example, and changes, during the actual use, between output voltages $V_{min}$ to $V_{max}$ in accordance with the stroke.

In a basic operation of the shift rod device 10 configured as above, when performing a gear shift during traveling, a rider kicks up or kicks down the gear shift pedal 12. In conjunction with the shift operation with respect to the gear shift pedal 12, the shift shaft 205 rotates in the transmission apparatus 200 via the shift rod device 10. By the rotation of the shift shaft 205, the shift cam 207 is rotated via the shift arm 206, and by corresponding to this, the shift fork 209 slides and moves the predetermined transmission gears. Consequently, the combination of the transmission gears is changed, and the gear shift is conducted. Note that the shift-up is realized by kicking up the gear shift pedal 12 (arrow mark UP in FIG. 3), the shift-down is realized by kicking down the gear shift pedal 12 (arrow mark DOWN in FIG. 3), and in accordance with this, the shift rod 14 extends or contracts, and the piston 17 moves in the shift rod body 16. The shift operation as above is conducted every time the gear shift is performed, and the relationship between the shift-up and the shift-down, and the kicking-up and the kicking-down of the gear shift pedal 12 may also be opposite to the above-described relationship.

First, in the shift rod device 10 of the present invention, the stroke sensor 24 and the shift load sensor are integrally provided, namely, the extension and contraction amounts are detected by substantially the single sensor, which enables both of the shift-up control and the shift-down control. This realizes the miniaturization of device and the simplification of structure and contributes to the reduction in cost, and by miniaturizing the device, it is possible to improve the degree of freedom of layout of the device when the device is disposed at the side part of the vehicle, as illustrated in FIG. 1.

Further, the plurality of components of the sensor are disposed so as to make a stroke motion along the same axis in the shift rod body 16, which realizes a compact structure.

Out of the components, the stroke sensor 24 which relatively detects the movement amount of the magnet 23 in the non-contact manner, is disposed on the outer surface of the shift rod body 16 by facing the magnet 23, and is fastened and fixed by the screws 25. By attaching the stroke sensor 24 in the manner as described above, the positional accuracy between the magnet 23 and the stroke sensor 24 can be improved, and furthermore, the detection accuracy can be increased.

Further, the detection accuracy can be increased also by disposing the magnet 23 for measuring the stroke amount and the stopper pin 22 for regulating the stroke amount along the same axis. In this case, when the stopper pin 22 is formed of a metal member having no magnetism, the influence with respect to the detection operation of the stroke sensor 24 becomes small, which further increases the detection accuracy.

Further, the first spring 20 and the second spring 21 that apply the extension or contraction reaction forces are disposed at the positions, on both sides in the stroke direction of the piston 17, at which they face each other by sandwiching the first plunger 18 and the second plunger 19, respectively, therebetween.

Figure 7:
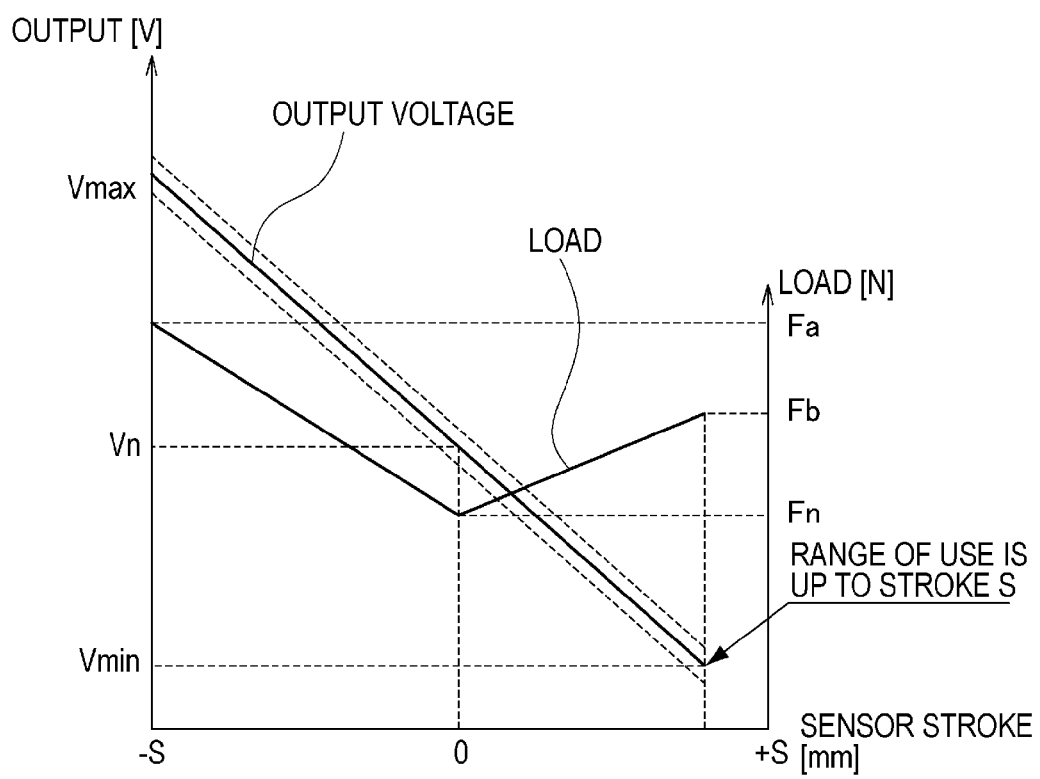
FIG. 7 is a diagram illustrating a relationship between a stroke and a voltage characteristic in the shift rod device related to the embodiment of the present invention.

The operating force by which the extension or contraction of the shift load sensor starts can be set independently, so that the operating force corresponding to a required load with respect to a rider mechanically required for the shift-up and the shift-down can be optimized, resulting in that the gear shift can be securely conducted. When FIG. 7 is referred to, a required load on the shift-up side is set to Fb, and a required load on the shift-down side is set to Fa, for example. As can be understood from the stroke/voltage characteristic diagram, with the use of the structure of the shift rod device 10 of the present invention, the setting of the operating load on the extension side and the setting of the operating load on the contraction side can be conducted independently, resulting in that optimum values of Fa and Fb can be obtained.

In this case, since the shift load sensor itself extends or contracts, so that a possibility of unintentional generation of rotational force of the gear shift lever 13 is low. An inertial force generated by an energy that extends or contracts the first and second springs 20 and 21 inside of the sensor helps the rotation of the gear shift lever 13, so that the gear shift lever 13 can be rotated securely with a small amount of force. Further, since the sensor is pushed in by the rider, the rider can securely apply the operating load to the shift load sensor, and the period of time during which the operating force is applied can be set to be longer than that with respect to a load sensor of load cell type, resulting in that a risk such as gear disengagement in the middle of gear shift caused by the short period of time of applying the operating load, can be avoided.

Further, the piston 17 is sandwiched by the first plunger 18 and the second plunger 19, and by the spring reaction forces of the respective first spring 20 and second spring 21, the piston 17 returns to the neutral position O when no operating load is applied.

The stopper pin 22 for regulating the stroke amount disposed on the axis same as that of the magnet 23, is pushed in by an initial load Fn (refer to FIG. 7) applied to the right and left first plunger 18 and second plunger 19, due to its structure, so that when the operating load is not applied, the stopper pin 22 is constantly positioned at the neutral position O. If the stroke S in the extension or contraction direction is previously set, it is possible to estimate, from a stroke amount, a load that works on the shift load sensor, as can be understood from the stroke/voltage characteristic diagram in FIG. 7. Therefore, it is possible to convert a detected stroke amount into a load on a control program of ECU, and to control, based on the load calculated as above, an ignition delay or an amount or a rate of misfire. In this case, by constantly detecting the stroke amount, it is possible to prevent an erroneous determination caused by an indefinite generation of signal such as one in the switch-type sensor.

Further, the dimension of the width w between the mutual stepped portion 27A and stepped portion 27B is set to a dimension same as that of the length l of the piston 17.

The two first plunger 18 and second plunger 19 abut against the stepped portion 27A and the stepped portion 27B, respectively, so that when there is no operating load, the piston 17 can be surely kept positioned at the neutral position O.

In this case, the stroke amount of the piston 17 is limited by the outside diameter d of the stopper pin 22 and the inside diameter D of the stopper hole 28 of the shift rod body 16, to thereby regulate the extension or contraction movement amount of the shift load sensor, resulting in that the proper operation of the device is guaranteed.

Note that in the above-described case, the shift-up and the shift-down are generally performed by the kick-up and the kick-down, respectively, and even though the same gear shift operation is performed, a rider can easily apply a load when performing the shift-down. Accordingly, if a threshold value Fa of the load at the time of performing the shift-down is set to a low value, the operating load for rotating the shift cam 207 becomes sometimes insufficient. For this reason, Fa and Fb have to be set independently.

Further, if the extension or contraction of the shift load sensor occurs at a small operating force, when, for example, the gear is shifted into neutral (between a first-speed and a second-speed, and the gear is shifted into neutral when operation is performed with a weak operating force), the shift load sensor is deformed, and it is difficult to perform the operation. Further, due to the extension or contraction deformation of the shift rod 14, if no measure is taken, no rigid feeling is provided at the time of shift operation. In order to prevent these, the initial load Fn is previously applied to the sensor operating load. Structurally, when the first spring 20 and the second spring 21 for extension or contraction are previously contracted, the initial load Fn is realized. The initial load Fn is set based on a shift rod operating force required for moving the shift cam to the neutral position.

In the foregoing, the present invention is described together with various embodiments, but, the present invention is not limited only to these embodiments, and changes and so on can be made within the scope of the present invention.

Regarding the operation of the gear shift pedal 12, although the above-described embodiment describes the example in which the kick-up realizes the shift-up, and the kick-down realizes the shift-down, a configuration opposite to that of this example may also be employed.

The application of the present invention is not limited to the case of the above-described embodiment, and a similar structure can be applied to, for example, a shift linkage of a four-wheeled vehicle, and in this case, it becomes possible to perform a gear shift without a clutch operation.

According to the present invention, the stroke sensor and the springs are combined to integrally realize the function of the stroke sensor and the function of the load sensor, and by sharing the stroke sensor, the internal strength members, the piston making the stroke motion and the like for the shift-up (the contraction direction of sensor, for example) and for the shift-down (the extension direction of sensor), the sensor for the shift-up and that for the shift-down can be integrated and miniaturized.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A shift rod device of a motorcycle being a shift rod device of a motorcycle having a link mechanism, in a motorcycle having a transmission making a shifting dog to be moved via a shift cam and a shift fork by a rotation of a shift shaft, in which a shift rod driven by an operation of a gear shift pedal is configured to drive the shift shaft to rotate via a gear shift lever, the shift rod device of the motorcycle comprising:
   a stroke sensor measuring a stroke amount, and a shift load sensor making a stroke motion in extension and contraction directions in accordance with shift-up and shift-down operating loads from the gear shift pedal, the stroke sensor and the shift load sensor being integrally provided in the shift rod, wherein the shift rod is formed of a shift rod adjuster and a shift rod body, wherein:
   a piston, a first plunger, a second plunger, a first spring, a second spring, a stopper pin, and a magnet are built in the shift rod body as components of the shift load sensor, and these components make a stroke motion along the same axis in an inside of the shift rod body; and
   the stroke sensor is disposed on an outer surface of the shift rod body by facing the magnet, and relatively detects a movement amount of the magnet in a non-contact manner.

2. The shift rod device of the motorcycle according to claim 1, wherein the stroke sensor is fastened and fixed to the shift rod body by screws.

3. The shift rod device of the motorcycle according to claim 1, wherein the first spring and the second spring that apply extension or contraction reaction forces of the shift load sensor are disposed at positions, on both sides of the piston, at which they face each other by sandwiching the first plunger and the second plunger, respectively, there between.

4. The shift rod device of the motorcycle according to claim 1, wherein:
   the piston is sandwiched by the first plunger and the second plunger, the first spring presses the first plunger, and the second spring presses the second plunger; and
   because of spring reaction forces of the respective first spring and second spring, the piston returns to a neutral position when the operating load is not applied.

5. The shift rod device of the motorcycle according to claim 1, wherein
   a dimension of a length of the piston and a dimension of a width between stepped portions provided on an inner surface of the shift rod body are the same.

6. The shift rod device of the motorcycle according to claim 1, wherein:
   the magnet is provided on an axis same as that of the stopper pin that regulates an extension or contraction movement amount of the shift load sensor; and
   the stopper pin is formed of a metal member having no magnetism or having a magnetism at a level of substantially exerting no influence on a detection accuracy of the stroke sensor.

7. The shift rod device of the motorcycle according to claim 6, wherein the extension or contraction movement amount of the shift load sensor is regulated by an outside diameter of the stopper pin and an inside diameter of a stopper hole provided to the shift rod body.

* * * * *